United States Patent
Richardson et al.

(10) Patent No.: US 9,221,701 B2
(45) Date of Patent: Dec. 29, 2015

(54) METHODS FOR REDUCING SCALE FORMATION ON AND REMOVING DEPOSITS FROM HEAT TRANSFER SURFACES

(75) Inventors: John Richardson, Hanover, VA (US); Rob Bedinger, Richmond, VA (US); James Wilkins, Richmond, VA (US)

(73) Assignee: CHEMTREAT, INC., Glen Allen, VA (US)

( * ) Notice: Subject to any disclaimer, the term of this patent is extended or adjusted under 35 U.S.C. 154(b) by 0 days.

(21) Appl. No.: 13/301,776

(22) Filed: Nov. 21, 2011

(65) Prior Publication Data

US 2012/0125864 A1    May 24, 2012

Related U.S. Application Data

(60) Provisional application No. 61/415,798, filed on Nov. 19, 2010.

(51) Int. Cl.
  *C02F 1/00*   (2006.01)
  *C02F 1/20*   (2006.01)
  *C02F 1/68*   (2006.01)
  *C02F 5/10*   (2006.01)
  *B01D 1/16*   (2006.01)
  *B01D 3/00*   (2006.01)
  *B01D 3/34*   (2006.01)

(52) U.S. Cl.
  CPC ... *C02F 5/10* (2013.01); *B01D 1/16* (2013.01); *C02F 2303/08* (2013.01)

(58) Field of Classification Search
  CPC .............................. B01D 1/16; C02F 2303/08
  See application file for complete search history.

(56) References Cited

U.S. PATENT DOCUMENTS

| | | | |
|---|---|---|---|
| 4,279,767 A * | 7/1981 | Muccitelli | 252/178 |
| 4,631,131 A * | 12/1986 | Cuisia et al. | 210/697 |
| 5,124,046 A * | 6/1992 | Sherwood et al. | 210/699 |
| 5,156,706 A * | 10/1992 | Sephton | 159/47.1 |
| 6,183,649 B1 * | 2/2001 | Fontana | 210/699 |
| 6,645,384 B1 * | 11/2003 | Richardson et al. | 210/699 |
| 7,591,309 B2 * | 9/2009 | Minnich et al. | 166/266 |
| 2005/0150520 A1 * | 7/2005 | Gill et al. | 134/22.1 |
| 2008/0099154 A1 * | 5/2008 | Minnich et al. | 159/47.3 |
| 2011/0079503 A1 * | 4/2011 | Heins et al. | 203/7 |
| 2012/0006671 A1 * | 1/2012 | Nowak | 203/7 |

OTHER PUBLICATIONS

Oct. 14, 2015 Office Action issued in Canadian Application No. 2,853,698.

* cited by examiner

*Primary Examiner* — Allison Fitzsimmons
*Assistant Examiner* — Clare Perrin
(74) *Attorney, Agent, or Firm* — Oliff PLC (57) ABSTRACT

Disclosed are methods of operating steam generators, particularly evaporators, in hard water environments characterized by high Si and Mg content in which the $pH_{cold}$ of the feed water stream is maintained within a range of about 11 to 12 in order to reduce, eliminate or remove scale from internal evaporator surfaces. Additional components may be added to the feed water stream including surfactants, chelants, dispersants, sequestrants and mixtures thereof.

22 Claims, 7 Drawing Sheets

| Analysis (% by Weight) | EVAPORATOR #1 |
|---|---|
| Loss on Ignition @ 650 C | 19.8 |
| Calcium, as CaO | 18.1 |
| Magnesium, as MgO | 4.5 |
| Iron Oxides, as $Fe_2O_3$ | 0.2 |
| Sodium, as $Na_2O$ | 3.4 |
| Aluminum, as $Al_2O_3$ | 0.4 |
| Chloride, as Cl | 0.7 |
| Carbonate, as $CO_2$ | 8.2 |
| Sulfate, as $SO_3$ | 4.7 |
| Silica, as $SiO_2$ | 38.1 |

Organic Cleaner

FIG. 7B

Calcium Carbonate Cleaner

FIG. 7C

Multifunctional Calcium Carbonate + Magnesium Silicate

METHODS FOR REDUCING SCALE FORMATION ON AND REMOVING DEPOSITS FROM HEAT TRANSFER SURFACES

PRIORITY STATEMENT

This application claims priority from U.S. Prov. Pat. Appl. No. 61/415,798, filed Nov. 19, 2010, the disclosure of which is incorporated herein, in its entirety, by reference.

TECHNICAL FIELD

The invention disclosed and claimed herein relates to methods of altering and/or controlling the chemistry of aqueous solutions during heating and/or evaporative processes whereby the scaling and/or corrosion of heating surfaces is suppressed, eliminated or reversed. These methods are particularly useful for suppressing scaling in steam generation equipment including evaporators and boilers used in, for example, water remediation, geothermal and/or oil recovery operations such as steam assisted gravity drainage (SAGD) operations.

BACKGROUND OF THE INVENTION

Steam generation using recycled water feedstock is a conventional practice during, for example, operations directed to recovering heavy oil from tar sands or other geological formations. The steam is utilized for heating the target hydrocarbons, thereby reducing their viscosity and increasing the mobility of hydrocarbons within the geological formation or other matrix in which it is naturally distributed. Prior art systems have incorporated a number of steam generator configurations including, for example, once-through type steam generators (OTSGs). As generally utilized in the industry, however, OTSGs tend to operate with relatively high blowdown rates, often in the range of from about 20% to 30%, resulting in substantial thermal budget and chemical treatment inefficiencies. Also, OTSGs are most commonly configured so that the steam is generated from the feed water stream in a single-pass operation through boiler tubes that are heated by gas or oil burners. OTSGs are typically operated to produce steam at pressures of from about 1000 pounds per square inch gauge (psig) to about 1800 psig while utilizing feed water that can have about 2000 mg/L to about 8000 mg/L of total dissolved solids (TDS).

The use of OTSG for SAGD applications requires a series of vapor-liquid separators to produce the requisite steam quality. For both SAGD and non-SAGD applications, pretreatment of the OTSG feed water has consisted of silica reduction in a hot or warm lime softener, filtration and hardness removal by Weak Acid Cation (WAC) ion exchange. In most cases, the OTSG blowdown is disposed by deep well injection. As the use of SAGD increased, the traditional produced water treatment and steam generation methods were re-evaluated to determine whether alternative methods may provide more technically and economically viable solutions. One such alternative, the use of vertical-tube Mechanical Vapor Compression (MVC) evaporation, has rapidly become the "baseline" approach against which other technologies are evaluated. In addition, the method allows the use of standard or "packaged" drum boilers in lieu of OTSG for steam generation, providing further technical and economic benefits. In order to suppress silica scaling in the evaporator, conventional practice, as reflected by the operating conditions recommended by the evaporator manufacturers, is to maintain the aqueous solution at a relatively high pH of about 13 or more using sodium hydroxide and/or other base(s), to maintain silica solubility.

The conventional practice of operating at high pH is not, however, sufficient to maintain clean deposit-free heat transfer surfaces, particularly in systems in which substantial calcium and/or magnesium are introduced into the evaporator with the makeup water. The source of evaporator makeup can be a combination of surface water and increasingly brackish water sources are being utilized. Even when operating in the recommended elevated pH range, such systems tend to remain susceptible to the formation of calcium carbonate and/or magnesium silicate deposits which impede heat transfer and are difficult to remove, typically requiring time consuming off-line chemical and mechanical cleaning to restore the heat transfer surface. Depending on the makeup water composition, hydrocarbon fouling may also be a concern and may further reduce the system's heat transfer efficiency. And finally, the large amount of sodium hydroxide (caustic) or other bases consumed in the process of maintaining the system in the high pH target range can constitute a substantial expense and complicate waste water treatment as well.

In addition to the conventional high pH operation, another method of reducing the likelihood of scaling within such systems has been proposed whereby the silica concentration of the feed water is reduced before entering the evaporator. One such method utilizes a sorption chemical added to an evaporator assembly arranged upstream of the main boiler/steam generator. According to the disclosure materials, the sorption chemical also removes a portion of the calcium and magnesium from the system, thereby permitting utilization of high hardness and/or saline makeup water while reducing the caustic demand relative to conventional operations.

Figure 1:
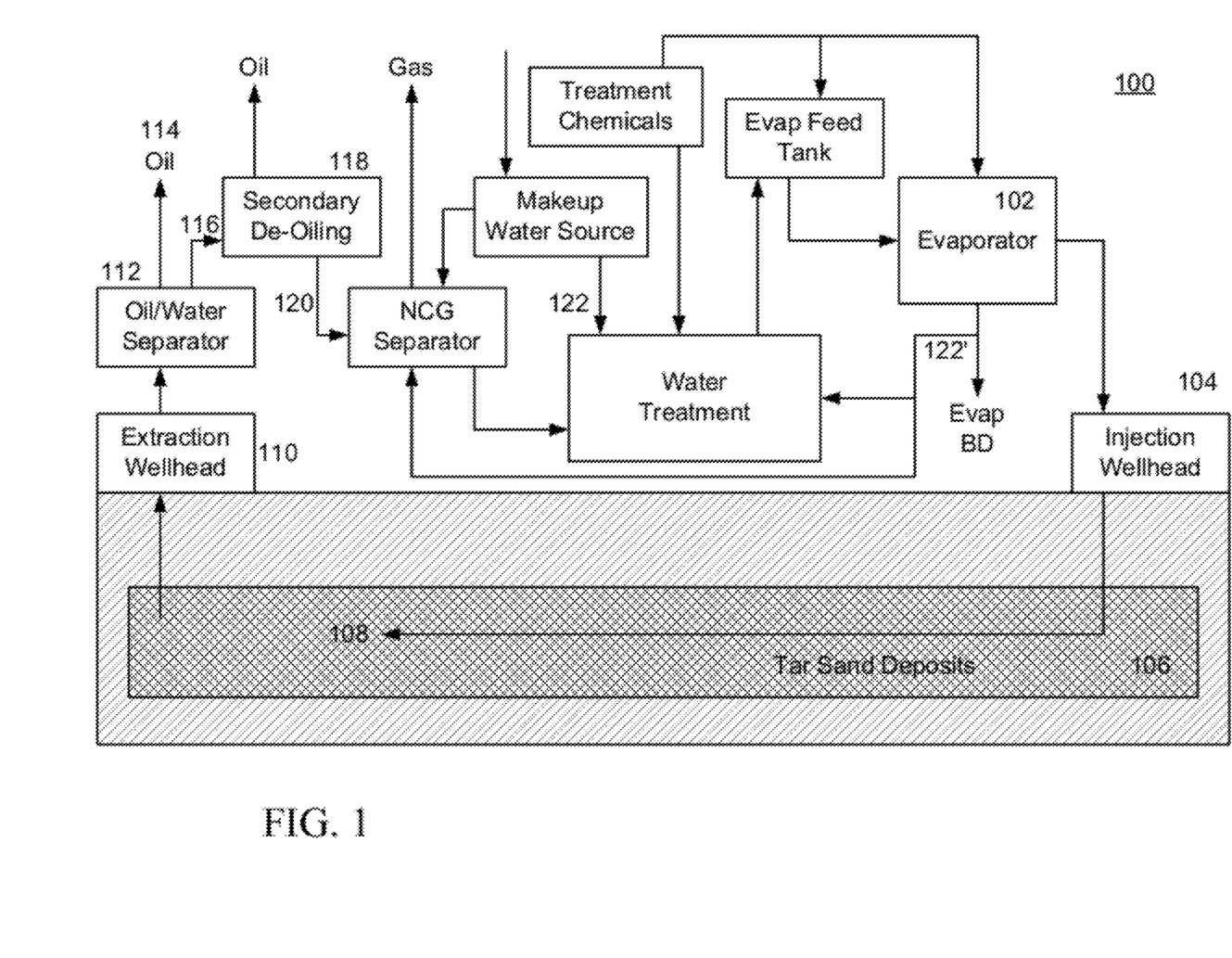
FIG. 1 illustrates a conventional prior art process, specifically a generalized process diagram for a physical-chemical water treatment operation configured for use in connection with a heavy oil recovery operation.

FIG. 1 depicts a conventional SAGD water treatment system 100, utilizing an evaporator system 102 configured for producing steam that may, in turn, be utilized as a boiler feed stream for producing the high quality steam utilized in steam injection systems. The high quality steam is injected through one or more steam injection wells 104, typically in combination with other injectant compositions, for fluidizing the heavy oil formation(s) 106 such as the heavy oils found in tar sand formations. As the injected steam cools and condenses, an oil/water mixture 108 is produced and begins to migrate through the formation toward one or more oil/water gathering wells 110, through which the oil/water mixture is pumped to the surface. The recovered oil/water mixture is then sent through an oil/water separator 112 in the mixture is separated into an oil-rich fraction 114 and an oil-contaminated aqueous fraction 116. The aqueous portion is typically subjected to an additional de-oiling process 118 to produce a de-oiled water stream 120 that can become part of the steam generator feed stream after additional treatment.

The disclosed method is directed to the treatment of the de-oiled water stream 120 and any additional makeup water or feed streams 122, 122' before the various feed streams are introduced into the steam generator and/or the monitoring and treatment of the water within the steam generator itself.

As noted above, many conventional SAGD operations utilize OTSGs for creating the steam necessary the oil recovery operations. These OTSGs may include some provision for some initial treatment of the feed water stream. The water treatment is typically configured to ensure that the TDS value of the feed water is below a target maximum value (typically within about 8,000 to about 12,000 parts per million (ppm) (frequently reported as $CaCO_3$ equivalents)) and that the feed water meets various other specific water treatment parameters, e.g., pH, before the water can be fed into the OTSGs for generating high pressure steam.

Accordingly, in most prior art water treatment schemes, the de-oiled water is subjected to costly treatment(s) in a water treatment sub-system before it can be sent to the steam generators. The treatments performed within the sub-system may include, for example, warm lime softeners for removing hardness as well as the addition of other softening chemicals including, for example, lime, flocculating polymer(s), and/or soda ash. The softener operation is frequently followed by filtration for reducing any carry-over of precipitate(s) or other suspended solids and a "polishing" operation utilizing ion-exchange, e.g., a weak acid cation (WAC) ion-exchange system, for removing additional hardness and reducing the associated alkalinity. As will be appreciated by those skilled in the art, these softener and ion exchange systems require regeneration chemicals and generate additional waste streams. Additional discussion of such systems may be found, for example, in Heins' U.S. Pat. No. 7,967,955, the contents of which are hereby incorporated, by reference, in their entirety.

For SAGD processes, one hundred percent (100%) quality steam is generally preferred for well injection (i.e., no entrained liquid water present in the injected steam) that tends to make the use of OTSGs problematic. Specifically, in order to produce 100% quality steam from an OTSG, a vapor-liquid separator must be used for separating the liquid water from the steam prior to injection. The liquid fraction extracted from the separator is then typically flashed in a series of flash tanks to recover a series of lower pressure steam flows which may be utilized for other plant heating purposes. After the last flashing stage has been completed, the residual hot water blowdown stream must then be handled, typically by recycling and/or disposal.

In summary, the conventional and widely utilized methods for treating heavy oil field produced waters in order prepare them for use in the feed stream for high quality steam generator operations are not entirely satisfactory. In particular, the conventional physical-chemical treatment process schemes are usually quite extensive, are relatively difficult to maintain and require significant operator attention. Further, the conventional physical-chemical treatment processes necessitate the use of a number of chemical additives which may comprise a considerable operating expense, may require special attention for safe handling and produce substantial quantities of undesirable sludge(s) and other waste streams, the disposal of which is increasingly difficult and/or expensive as the result of increasingly stringent environmental and regulatory requirements.

It is clear that the development of a simpler, more cost effective approach to water treatment in connection with high quality steam generation, particularly with respect to evaporator operation, would be desirable, particularly in connection with SAGD operations for heavy oil production. The new water treatment method(s) disclosed herein, and various embodiments thereof, can be successfully applied to a range of industrial applications including, for example, heavy oil production operations, for improving the evaporator operation.

Other important objectives, features, and additional advantages of the various embodiments of the novel process disclosed herein will become apparent to the reader from the foregoing and from the appended claims and the ensuing detailed description, as the discussion below proceeds in conjunction with examination of the accompanying drawing.

BRIEF SUMMARY

Disclosed is a method of operating a steam generator that accommodates use of hard water feed water streams in evaporators while reducing, preventing or removing scale deposits, particularly Mg, Si and Ca based scale deposits, by operating the evaporator with feed water stream adjusted to provide a $pH_{cold}$ of about 11 to 12 in the evaporator concentrate. Additional scale control, and perhaps some broadening of the available $pH_{cold}$ range, may be achieved by introducing one or more additive packages into the feed water stream or the evaporator concentrate including a chelant composition comprising, for example, nitrilotriacetate (NTA), ethylene diamine tetra acetate (EDTA), diethylene triamine pentaacetate (DTPA), N-hydroxyethylethylenediamine triacetate, nitrilotri-acetate, ethylenediamine tetraproprionate, triethylenetetraaminehexa-acetate (HEDTA), triethylenetetraminehexaacetic acid (TTHA) and propylene diamine tetraacetic acid (PDTA), ethylene diamine N,N'-disuccinic acid (EDDS), hexametaphosphate (HMP) and mixtures thereof. In such instances, the chelant composition will typically be added at a rate sufficient to maintain a stoichiometric ratio between 0.1:1 and 1.5:1 with a total hardness of the adjusted feed stream and preferably between 0.5:1 and 1.25:1.

The method of operating a steam generator according to the disclosure may also include deareating (or otherwise removing non-compressible gases (NCG)) from the feed water stream, preferably before adjusting the $pH_{cold}$ of the treated stream. Other additives to the feed water stream may include, for example, one or more of sequestrant compositions, such as 2-phosphonobutane-1,2,4-tricarboxylic acid (PBTC), surfactant compositions and/or dispersant compositions into the feed water stream in order to achieve a desire combination of properties. One additive that may be helpful in controlling magnesium silicate formation includes a multifunctional quad polymer such as ALCO's AR-540. If a sequestrant composition is utilized, it may be added at a rate sufficient to achieve a sequestrant:hardness ratio from 0.5:1 to 1.25:1 in the treated feed stream wherein the hardness may be Mg hardness, Mg+Ca hardness or total hardness.

at a rate sufficient to achieve a sequestrant:hardness ratio from 0.5:1 to 1:1 in the treated feed stream wherein the hardness may be Mg hardness, Mg+Ca hardness or total hardness.

The feed water stream in this instance should not be confused with the conventional "make up water" stream but instead may comprise a combination of aqueous streams from a group including de-oiled water, make up water, evaporator concentrate and mixtures thereof. The methods disclosed herein are thought to be particularly effective in those systems exhibiting an excess of Si relative to Mg and/or Ca. Indeed, the methods disclosed herein are thought to be particularly effective when the adjusted feed stream is characterized by a Si:Mg ratio of at least 5:1 and possibly greater than 100:1.

BRIEF DESCRIPTION OF THE DRAWINGS

In order to provide a more complete explanation of the water treatment methods and associated systems as disclosed and claimed herein, and the various embodiments thereof, attention is directed to the accompanying figures, wherein:

FIGS. 7A-C illustrate residual deposits obtained by applying various cleaning techniques to conventional deposits; and The foregoing figures, being merely exemplary, are not drawn to scale and have been simplified to represent various basic operational components that may be utilized in practicing one or more embodiments of the disclosed methods depending upon the particular operational parameters. It is believed that these figures are sufficient to illustrate the basic design elements to a degree that one of ordinary skill in the art can readily develop an understanding of the various embodiments and aspects of the invention as disclosed and claimed herein.

DETAILED DESCRIPTION

Many steam assisted heavy oil recovery schemes including, for example, steam assisted gravity drainage (SAGD) heavy oil recovery processes, utilize the basic injection well and recovery well arrangement of the type depicted in FIG. 1. For both oil recovery and other industrial operations that utilize large quantities of steam, it is desirable to operate the evaporators/steam generators in a manner that reduces the likelihood of scaling, reduces maintenance costs and/or reduces the amount of caustic consumed for maintaining the pH of the aqueous system. For convenience, the following description will focus on a SAGD operation, but those skilled in the art will appreciate that the fundamentals of the methods disclosed herein for operating the evaporators/steam generators will be equally applicable to a wide range of other industrial operations.

In a conventional SAGD process, horizontal injection wells and horizontal oil/water gathering wells are arranged throughout an oil bearing formation. As discussed above, steam and other injectants are introduced into the oil bearing formation through the injection wells. The injected materials then flow through the formation and entrain a portion of the formation to form a mixed stream that includes a substantial oil component. This mixed stream is then recovered through the gathering or recovery wells and sent to the associated plant for oil recovery and additional processing.

The mixed stream is typically sent through a series of oil/water separators from which the majority of the oil fraction is collected for further conditioning, transport and/or sale. The remaining fraction, comprising mainly water, is typically sent through one or more additional de-oiling steps to remove even more of the residual hydrocarbons. This secondary de-oiling operation may incorporate unit operations including, for example, dissolved air flotation units, with or without the addition of one or more de-oiling polymer(s) and/or other conventional unit processes in order to obtain a target maximum residual oil level of, for example, no more than 20 ppm.

In the water treatment methods disclosed herein, the de-oiled water stream may then be subjected to additional treatment and conditioning before being fed into one or more evaporator units including, for example, reverse osmosis (RO) treatment. As will be appreciated by those skilled in the art, the degree and nature of the treatment and conditioning necessary to obtain a water stream suitable for injection into the evaporator unit(s) will typically vary somewhat based on feed water chemistry, i.e., the range and concentration(s) of the various dissolved and suspended solids within both the de-oiled water stream and any other makeup water streams as well as the cycles of concentration target for the evaporator unit(s).

Figure 2:
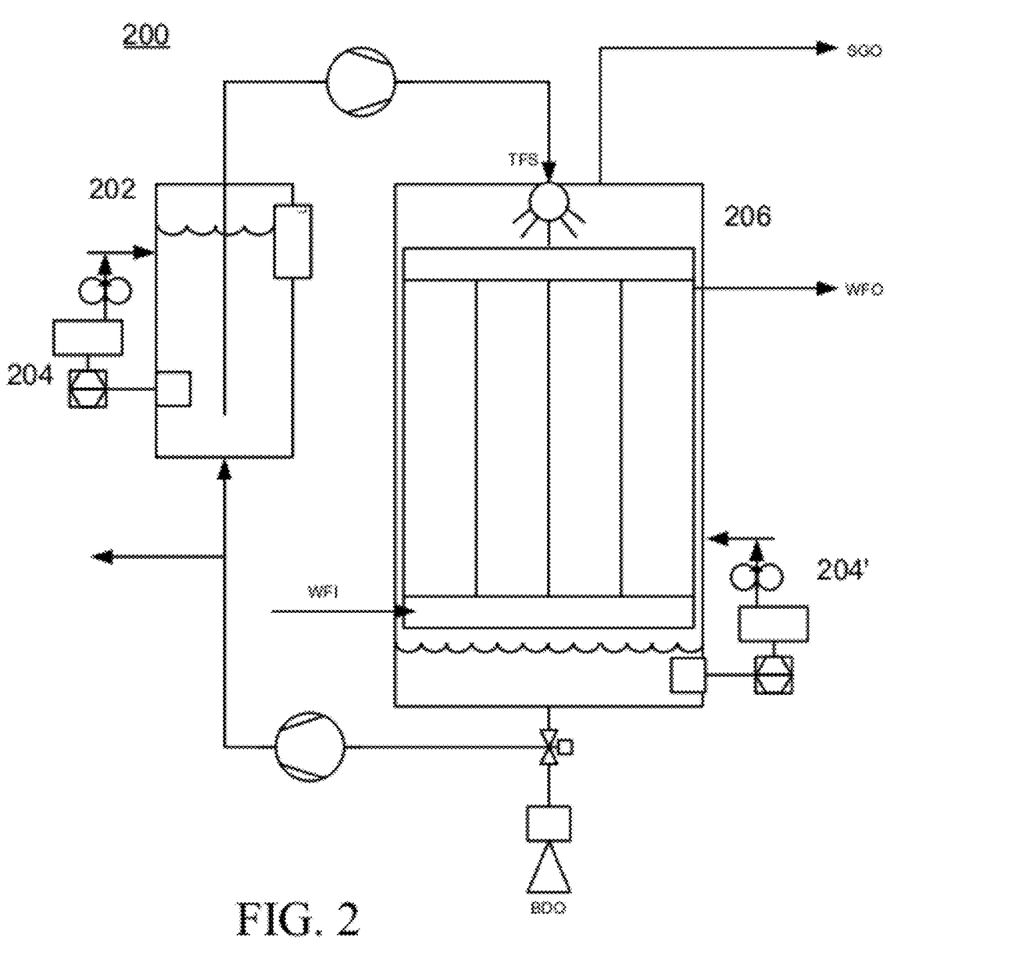
FIG. 2 illustrates an example of a steam generator configured for operation in accord with the methods disclosed herein.

In some embodiments, it may be necessary or appropriate to acidify one or more of the water stream(s) in order to lower the pH to a degree sufficient to convert bound carbonates to free gaseous carbon dioxide, which can then be removed along with other non-condensable gases dissolved in the feed water, in an evaporator feed water deaerator. As noted above, however, because conventional evaporator operation utilizes a high pH range, e.g., 13 or more, treating the feed water for injection into the evaporator will be complicated by the upstream use of acid. For pH control, as seen in FIG. 2, treatment chemicals including, for example, caustic can be added to the feed water/feed water reservoir and/or directly to the concentrated brine recirculating in the evaporator.

It is to be understood that the falling film evaporator design and SAGD application are utilized only for purposes of illustration and to aid those of ordinary skill in the art in understanding the water treatment process(es) taught herein, and is not intended to limit the process to the use of such evaporator design. Indeed, those skilled in the art will recognize that other designs including, for example, boilers, forced circulation evaporators and/or rising film evaporators, may be alternately utilized with the accompanying benefits and/or drawbacks inherent in the operation of such units.

In any event, in a falling film evaporator embodiment, the fed water descends by gravity along heated tubes thereby resulting in the evaporation and purification of a portion of the feed water. The residual portion of the feed water, along with most dissolved contaminants, will then accumulate above a bottom tube sheet as the evaporator concentrate until it is removed through evaporator concentrate and/or blowdown lines. The evaporator concentrate may subjected to further treatment in a concentrate treatment plant before being discharged in a waste stream or fed back upstream to become a portion of the evaporator feed water.

Depending on the water quality and the particular equipment and processes being utilized, it may be desirable, or even necessary, to further reduce the level of one or more residual organic compounds and/or dissolved solids from the feed water before it enters the evaporator. A number of ion exchange system configurations, with or without an organic trap, may be suitable for such an operation depending, of course, on the particular combination of ions that are to be removed, the relative concentration levels and the ion exchange chemistry being utilized.

One of the significant economic advantages of using a vertical tube, falling film evaporator is the on-line reliability and redundancy available when multiple evaporators are utilized. An evaporative based produced water treatment system can, therefore, provide an increase of perhaps 2% or more in overall heavy oil recovery plant availability when compared with alternative systems, particularly the conventional lime and clarifier treatment process as detailed above. These increases in availability relate directly to increased oil production and thus represent a substantial economic advantage over the typically life cycle of heavy oil recovery plants.

In the processes according to the disclosure, the evaporator should typically be able to produce high quality distillate (typically 2-5 ppm non-volatile TDS) which can be feed into downstream steam generation/injection operations utilizing conventional boilers and/or OTSGs with or without some additional polishing. In short, evaporative treatment of feed water using a falling film, vertical tube evaporator according to the present disclosure can be both technically and economically superior to conventional art water treatment processes. The resulting high quality distillate stream may be utilized in, for example, SAGD and non-SAGD heavy oil recovery operations as direct feeds to either OTSGs or conventional boilers.

The feed water readily available for use in heavy oil production can exhibit high silica values of, for example, 200 mg/l as $SiO_2$, or higher. In particular, the Canadian prairie provinces (mainly Saskatchewan and Manitoba) also contain high quantities of calcium and magnesium, often as dolomite, which are readily soluble in the groundwater that also contains elevated concentrations of carbon dioxide. Accordingly, in these portions of Canada, the total hardness of the ground water, as measured in ppm of calcium carbonate equivalent, will frequently exceed 200 ppm.

Silica that is not removed before the feed water enters the evaporator will tend to increase the risk of scaling the internal surfaces of the evaporator, particularly when being fed in combination with problematic levels of calcium and/or magnesium. Although the conventional practice relies on an elevated pH, e.g., at least 13, to maintain silica solubility, practice has shown that such levels alone are not sufficient to prevent evaporator scale formation and, in addition, require a substantial quantity of caustic to maintain the pH. In particular, in those operations in which the feed water also contains substantial concentrations of calcium and magnesium, a scale layer including calcium carbonate and magnesium silicate tends to form on the heated evaporator surfaces. This scale layer has proven difficult to remove, typically requiring off line chemical and mechanical cleaning to restore the heat transfer capability of the evaporator, thereby reducing capacity and/or increasing maintenance costs.

It has been discovered that sufficient scale control can be achieved at lower pH levels, e.g., 11-12, even in high silica systems, thereby reducing the caustic demand and simplifying subsequent disposal of the waste streams. Additional protection against the precipitation of hardness salts can be achieved by utilizing one or more chelants including, for example, ethylene diamine tetraacetic acid (EDTA), nitrilotriacetic acid (NTA) and/or tripolyphosphate (TPP), added to the feed water at an appropriate stoichiometric ratio. Another compound that can be useful in treating the feed water in the disclosed method is hexametaphosphate (HMP) which can provide both chelant and hydrocarbon dispersant functionality. Indeed, it has been observed that evaporators switched to operation in accord with the methods disclosed herein can experience a net removal of scale even when operating at high cycles of concentration with high silica values.

Suitable amino carboxylate chelating agents include, for example, nitrilotriacetates (NTA), ethylene diamine tetra acetate (EDTA), diethylene triamine pentaacetate (DTPA), N-hydroxyethylethylenediamine triacetate, nitrilotri-acetate, ethylenediamine tetraproprionate, triethylenetetraamine-hexa-acetate (HEDTA), triethylenetetraminehexaacetic acid (TTHA) and propylene diamine tetraacetic acid (PDTA). The chelating agents may typically be used in either their acid form or, alternatively, in their alkali metal salt forms.

Particularly suitable for use herein are diethylene triamine penta acetic acid (DTPA) and propylene diamine tetracetic acid (PDTA). A wide range of suitable amino carboxylate chelating agents is readily available from BASF, Florham Park, N.J., under the trade name TRILON® and the selection of appropriate chelating agent(s) is routinely performed by those of ordinary skill in the art in light of the particular requirements of the system and/or process. A preferred biodegradable amino carboxylate chelating agent suitable for use herein is ethylene diamine N,N'-disuccinic acid (EDDS), particularly as alkali metal salts, alkaline earth salts or mixtures thereof. Ethylenediamine N,N'-disuccinic acids, especially the (S,S) isomer are detailed in U.S. Pat. No. 4,704,233, the contents of which are hereby incorporated, in their entirety, by reference. Ethylenediamine N,N'-disuccinic acid is, for instance, commercially available under the tradename ssEDDS® from Palmer Research Laboratories, Manchester, UK.

The chelating agent(s), if utilized, can be introduced into the feed stream at a rate sufficient to maintain a target stoichiometric ratio relative to the Mg hardness, Ca hardness, Mg+Ca hardness or total hardness of the feed stream. In many instances, the Mg hardness may be of particular interest with the Ca concentration being of less concern. The chelating agent(s) are preferably maintained at a stoichiometric ratio of from 0.1:1 to 1.5:1, more preferably from 0.5:1 to 1.2:1 and, most preferably, from 0.8:1 to 1.0:1. As will be appreciated by those skilled in the art, the particular stoichiometric ratio range is that which retards or reverses scaling over the operational $pH_{cold}$ range of the particular evaporator system while reducing or preventing excess use of the chelating agent(s) and may change with the Si:Mg and/or Ca:Mg ratios in the feed water stream.

While not being bound by theory, it is believed that the disclosed method obtains improved performance in those systems having elevated silica content in the feed water stream whereby the silica can be functionalized for removing Mg and Ca scale. As a result, rather than attempting to prevent silica from reaching the evaporator, the disclosed method exhibits improved performance in those systems in which the Si:Mg ratio is at least 1:1, preferably between 5:1 and 10:1, and perhaps as high as 100:1 or more. Indeed, the samples illustrated in FIG. 3 had a Si:Mg ratio of 10:1.

Additional silicate control may be achieved through the addition of, for example, 2-phosphonobutane-1,2,4-tricarboxylic acid (PBTC), as a sequestering agent and calcium carbonate scale inhibitor, in combination with one or more quad polymers (QP), as disclosed in U.S. Pat. No. 6,645,384, the contents of which are incorporated, in their entirety, by reference, to achieve improved magnesium silicate control. A satisfactory quad polymer composition, specifically CL 3857, is available from ChemTreat, Inc., of Glen Allen, Va.

Similarly, hydrocarbon fouling of the heat transfer surfaces can be suppressed by adding a low-foaming surfactant detergent/dispersant system to the feed water, with or without a compatible antifoam system for improving the falling film characteristics. This improved method of evaporator operation will tend to reduce or reverse scaling, reduce caustic consumption and allow operation at cycles of concentration in excess of that which could be safely achieved with prior art methods. As will be appreciated by those skilled in the art, a wide range of dispersants are readily available and their selection is generally a routine matter guided by the requirements of the particular system/process being addressed. An example of a hydrocarbon dispersant that has been found to be suitable for use in combination with the disclosed methods comprises 50% water, 32% caustic soda (50% liquid), 4.7% HEDPA (60%), 2.4% phosphate ester 600, 9.3% PGME and 1.6% sodium glucoheptonate. Other dispersants and combinations of dispersants useful in such applications will be readily known to those of ordinary skill in the art.

Additional improvements have been achieved by completing the NCG separation and/or deareation (DA) operation before adding the caustic and/or other bases in order to reduce the $CO_2$ level in the feed water and thereby suppress formation of carbonic acid and the associated reduction of the pH.

An example system for practicing the disclosed method is illustrated in FIG. 2, in which additional detail is provided relative to the evaporator 102 and feed tank of FIG. 1. As illustrated in FIG. 2, the evaporator assembly 200 allows for monitoring various properties of the feed water in an evaporator feed tank and adjusting those properties before they are introduced into the evaporator 206. The system may also be configured for monitoring various properties of within the evaporator and adjusting one or more of those properties before the evaporator concentrate is returned to the evaporator feed tank (or directly to the evaporator (not shown) and/or routed to the blow down outlet to be removed from the system in order to maintain the cycles of concentration or other controlled parameter within the desired range.

Figure 3:
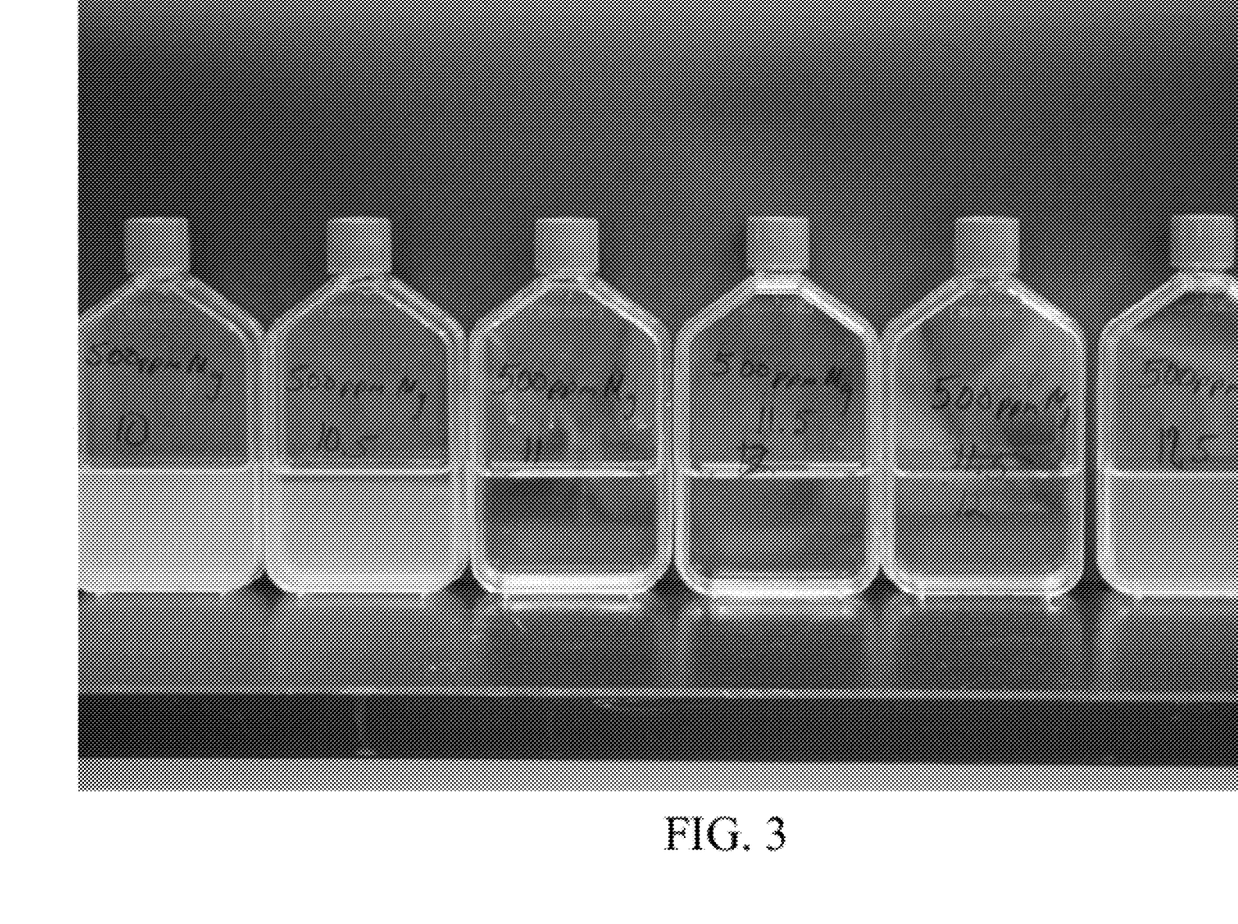
FIG. 3 illustrates the improved control of magnesium solubility obtained by operating in accord with the methods disclosed herein.
Figure 4:
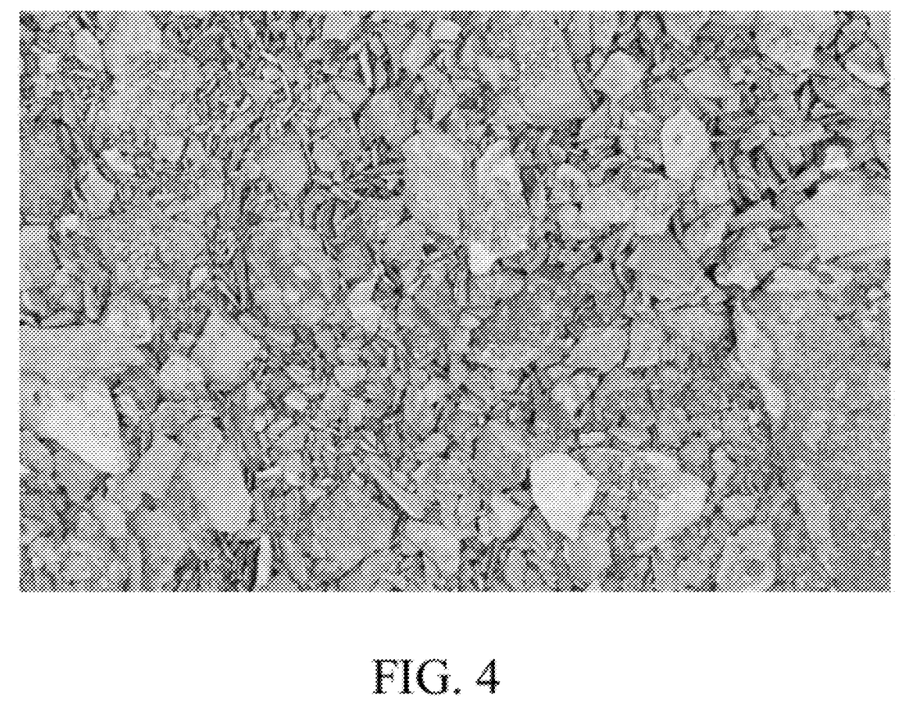
FIG. 4 is a photograph illustrating deposits associated with conventional evaporator operation.
Figure 5:
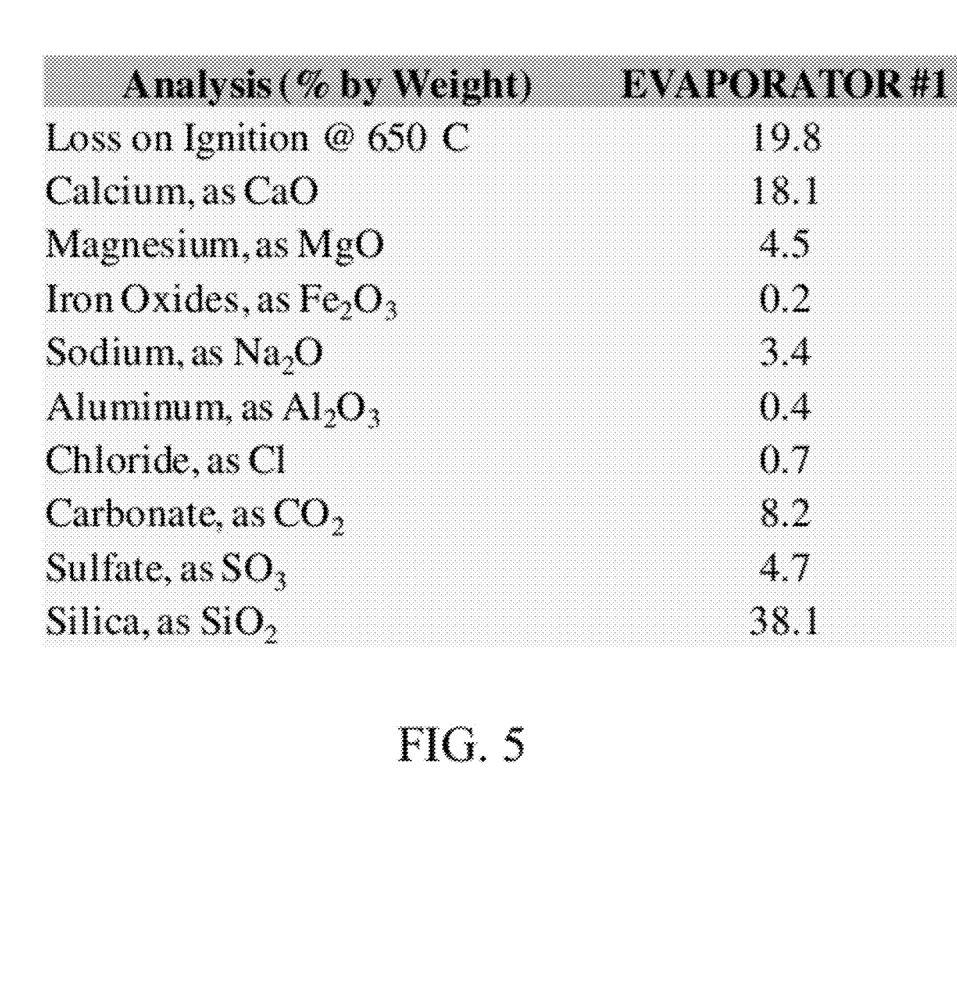
FIG. 5 is a chart reflecting lost on ignition (LOI) and XRF analysis of the deposits shown in FIG. 4.
Figure 6A:
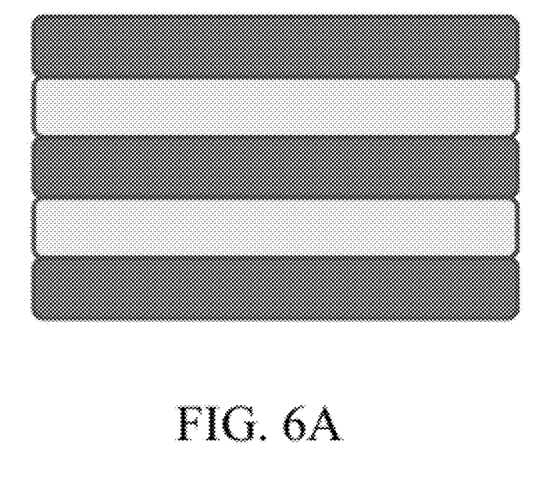
FIGS. 6A and 6B are a chart and a photograph illustrating in situ deposit formations associated with conventional evaporator operation.
Figure 6B:
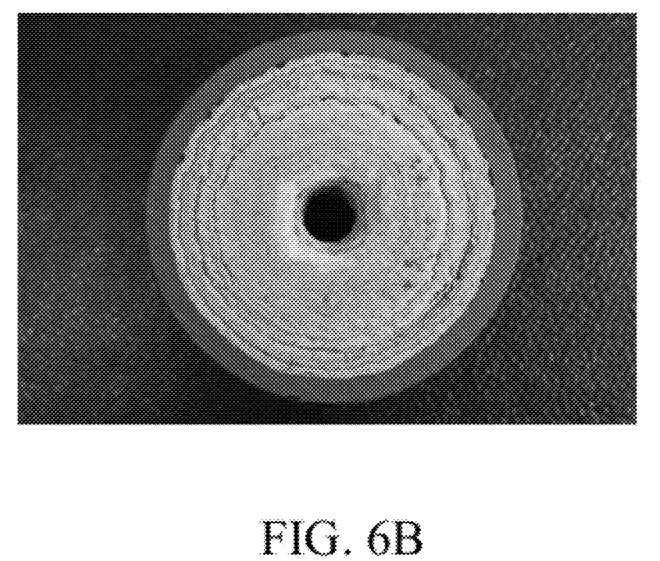
Figure 7A:
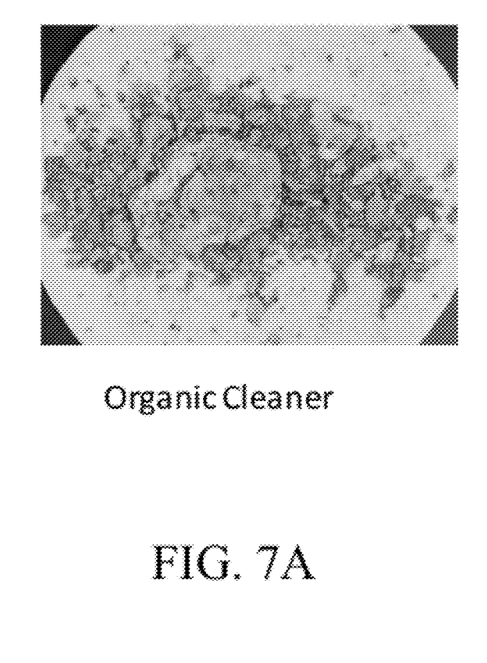
Figure 7B:
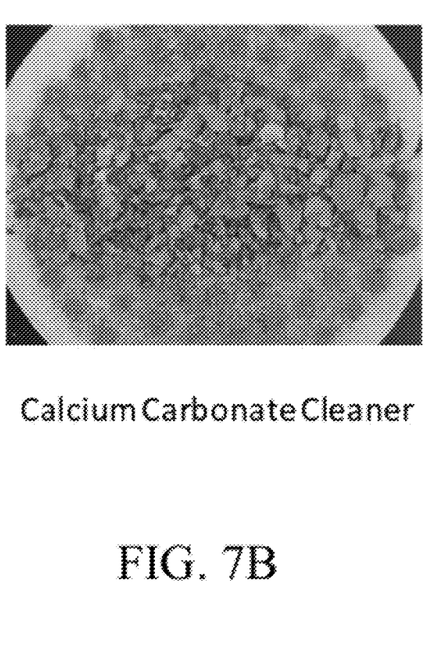
Figure 7C:
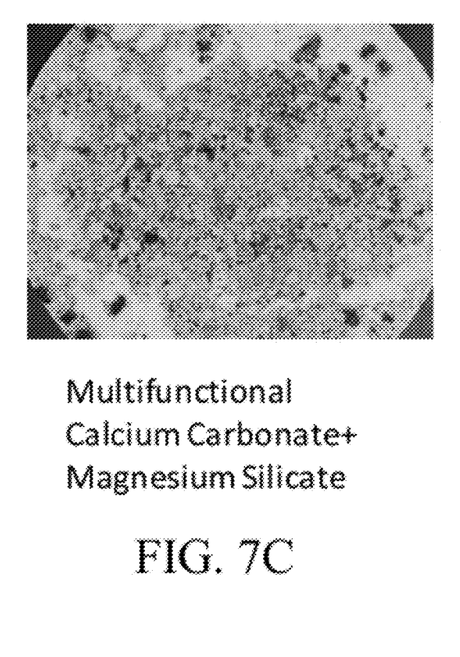

A screening test was conducted in order to evaluate the magnesium silicate inhibition performance of a number of treatment package combinations in combination with a test solution comprising 5000 mg/L sodium silicate and 500 mg/L magnesium. As illustrated in FIG. 3, with an appropriate water treatment package aboard, the samples adjusted to $pH_{cold}$ levels of 11.0, 11.5 and 12.0 are substantially clear, i.e., they do not exhibit the cloudiness associated with the precipitation of scale particles seen in the samples having a $pH_{cold}$ substantially below 11 or above 12. Additional testing has indicated that a satisfactory level of scale suppression could be achieved at $pH_{cold}$ values from 10.8 to 11.9.

As will be appreciated by those skilled in the art, the $pH_{cold}$ values are those recorded for solutions at or near room temperature while the corresponding $pH_{hot}$ values are those recorded for solutions at or near the operating temperature of the solution within the evaporator, e.g., 100-110° C., with the $pH_{cold} > pH_{hot}$ for the same solution. While $pH_{cold}$ values have been generally used herein for convenience, those skilled in the art will appreciate that sensors provided in the evaporator could be used to control the process using a corresponding and lower $pH_{hot}$ target range to achieve similar results.

A series of simulator tests were conducted using various treatment packages formulated using BL 100 (a 39% solution of sodium EDTA) and, in some instances, CL 3857 (an aqueous solution of 24% PBTC, specifically Bayer's BAYHIBIT AM inhibitor and 60% quadpolymer, specifically ALCO's AR-540). The formulation of the test packages T2-T4 and control B3F is provided below in TABLE 1:

TABLE 1

| Test Package | BL 100 (ppm) | CL 3857 (ppm) | $pH_{cold}$ |
|---|---|---|---|
| B3F | 0 | 0 | 12.50 |
| T2 | 200 | 0 | 12.25 |
| T3 | 200 | 2 | 11.50 |
| T4 | 200 | 2 | 11.88 |

Based on the results reflected in TABLE 2 and observations made during the simulation testing, it appears that even 2 cycle makeup water is not sufficiently stable above $pH_{cold}$ of 10.8 for evaporator operation without the addition of one or more scale suppression products. Indeed, without a sufficient concentration of the scale suppression product(s), the addition of caustic soda to bulk water can be sufficient to cause scale precipitation. Operation of the evaporator with the additive package, however, was able to provide acceptable results even at cycle of concentration of 25 and 50, particularly when the $pH_{cold}$ is below 12. The results reported in TABLE 2 include measurements for various chemical species as well as Total Harness Magnesium ($TH_{Mg}$), Total Suspended Solids (TSS) and Total Hardness as $CaCO_3$ (TH $CaCO_3$)

TABLE 2

| Test Pkg | B3F | T2:25 | T2:50 | T3:25 | T3:50 | T4:25 | T4:50 |
|---|---|---|---|---|---|---|---|
| $pH_{hot}$ | 11.58 | 11.37 | 11.37 | 10.75 | 10.75 | 11.06 | 11.06 |
| $pH_{cold}$ | 12.50 | 12.25 | 12.25 | 11.50 | 11.50 | 11.88 | 11.88 |
| Ca (ppm) | 20 | 394 | 619 | 430 | 654 | 355 | 836 |
| Mg (ppm) | 7.5 | 178 | 73 | 58 | 41 | 344 | 137 |
| CaF (ppm) | 0 | 402 | 649 | 359 | 636 | 355 | 831 |
| MgF (ppm) | 0 | 76 | 62 | 40 | 33 | 163 | 72 |
| $TH_{Mg}$ | 1036 | 833 | 1201 | 797 | 1156 | 818 | 1654 |
| Si | 6837 | 5494 | 7916 | 5258 | 7625 | 5126 | 10908 |
| SiF | 3045 | 5602 | 8310 | 4614 | 7625 | 5029 | 10781 |
| TSS | 1213 | 192 | 121 | 490 | 65 | 108 | 585 |
| TH ($CaCO_3$) | 27.5 | 572 | 692 | 488 | 695 | 699 | 973 |

In those simulator runs that did result in some scale deposition, the scale's resistance to cleaning appeared to be a function of the pH at which the scale had been deposited. For example, the scale deposited when operating the evaporator at a $pH_{cold}$ of 11.5 resulted in a deposit that was much more easily removed than the scale deposits formed during evaporation operations at a $pH_{cold}$ in excess of 11.9. Indeed, the scale formed at pH values in excess of 11.9 were particularly persistent and difficult to remove.

Among the various chelant compounds suitable for use in combination with the disclosed method, sodium hexametaphosphate appears to provide both improved scale formation suppression and a more easily removed scale deposit, particularly when compared with EDTA-based treatments utilized at substantially similar molar concentrations. It was also observed that evaporator operations at lower $pH_{cold}$ values results in more rapid scale development than operation above the target $pH_{cold}$ range of about 11 to about 12.

Although only several exemplary embodiments of this invention have been described in detail, it will be readily apparent to those skilled in the art that the disclosed evaporator operation and associated water treatment processes, and the apparatus for implementing these processes, may easily be modified from the exact embodiments provided herein without materially departing from the essential characteristics thereof. Accordingly, therefore, these disclosures are to be considered in all respects as illustrative and not restrictive. As will be appreciated by those skilled in the art, a number of other embodiments of the methods according to the disclosure are both feasible and would be expected to provide similar advantages. The scope of the invention, therefore, should be understood as encompassing those variations of the example embodiments detailed herein that would be readily apparent to one of ordinary skill in the art.

Further, while certain process steps are described for the purpose of enabling the reader to make and use certain water treatment processes shown, such suggestions shall not serve in any way to limit the claims to the exact variation disclosed, and it is to be understood that other variations, including various treatment additives or alkalinity removal techniques, may be utilized in practicing the disclosed methods.

We claim:

1. A method of operating a falling film evaporator comprising:
    introducing a water feed stream into the falling film evaporator, wherein the water feed stream contains (i) silicon, and (ii) greater than 200 ppm of a component selected from the group consisting of magnesium, calcium, and a combination thereof, as measured in ppm of calcium carbonate equivalent;
    evaporating a portion of the hard-water feed stream to produce a falling film evaporator concentrate; and
    adjusting a $pH_{cold}$ value of the falling film evaporator concentrate to a value in the range of 10.8 to 12.

2. The method of operating the falling film evaporator according to claim 1, further comprising:
    maintaining a chelant composition in the falling film evaporator concentrate.

3. The method of operating the falling film evaporator according to claim 2, wherein:
    the chelant composition is selected from a group consisting of nitrilotriacetate (NTA), ethylene diamine tetra acetate (EDTA), diethylene triamine pentaacetate (DTPA), N-hydroxyethylethylenediamine triacetate, ethylenediamine tetraproprionate, triethylenetetraaminehexa-acetate (HEDTA), triethylenetetraminehexaacetic acid (TTHA) and propylene diamine tetraacetic acid (PDTA), ethylene diamine N,N'-disuccinic acid (EDDS), hexametaphosphate (HMP) and mixtures thereof.

4. The method of operating the falling film evaporator according to claim 2, wherein:
    the chelant composition is at a concentration sufficient to maintain a stoichiometric ratio of between 0.1:1 and 1.5:1 between the chelant composition and a total hardness of the falling film evaporator concentrate.

5. The method of operating the falling film evaporator according to claim 2, wherein:
    the chelant composition is at a concentration sufficient to maintain a stoichiometric ratio of between 0.5:1 and 1.25:1 between the chelant composition and a total hardness of the falling film evaporator concentrate.

6. The method of operating the falling film evaporator according to claim 1, further comprising:
    deareating the water feed stream before introducing into the falling film evaporator.

7. The method of operating the falling film evaporator according to claim 1, further comprising:
    introducing a sequestrant composition into the falling film evaporator concentrate.

8. The method of operating the falling film evaporator according to claim 7, further comprising:
    introducing a quad polymer composition into the falling film evaporator concentrate.

9. The method of operating the falling film evaporator according to claim 1, further comprising:
    introducing a quad polymer composition into the falling film evaporator concentrate.

10. The method of operating the falling film evaporator according to claim 6, further comprising:
    introducing a quad polymer composition into the water feed stream at a rate sufficient to achieve a quad polymer concentration of from 250 ppb to 1 ppm in the water feed stream.

11. The method of operating the falling film evaporator according to claim 7, wherein:
    the sequestrant composition comprises 2-phosphonobutane-1,2,4-tricarboxylic acid (PBTC).

12. The method of operating the falling film evaporator according to claim 7, wherein:
    the sequestrant composition is introduced at a rate sufficient to achieve a sequestrant:hardness ratio from 0.5:1 to 1.25:1 in the falling film evaporator concentrate.

13. The method of operating the falling film evaporator according to claim 7, wherein:
    the sequestrant composition is introduced at a rate sufficient to achieve a sequestrant:Mg hardness ratio from 0.5:1 to 1:1 in the falling film evaporator concentrate.

14. The method of operating the falling film evaporator according to claim 1, further comprising:
    introducing a surfactant composition into the falling film evaporator concentrate.

15. The method of operating the falling film evaporator according to claim 1, further comprising:
    introducing a dispersant composition into the falling film evaporator concentrate.

16. The method of operating the falling film evaporator according to claim 6, wherein:
    the water feed stream an aqueous stream including at least one source selected from a group consisting of de-oiled water, ground water, make up water, a falling film evaporator concentrate recycle stream and mixtures thereof.

17. The method of operating the falling film evaporator according to claim 1, wherein:
    the water feed stream includes magnesium, and is characterized by a Si:Mg ratio of at least 5:1.

18. The method of operating the falling film evaporator according to claim 1, wherein:
    the water feed stream includes magnesium, and is characterized by a Si:Mg ratio of at least 10:1.

19. A method of operating a falling film evaporator comprising:
    providing a water feed stream, adjusting a $pH_{feed}$ of the water feed stream to produce an adjusted water feed stream, wherein
        the adjusted water feed stream contains (i) silicon, and (ii) greater than 200 ppm of a component selected from the group consisting of magnesium, calcium, and a combination thereof, as measured in ppm of calcium carbonate equivalent; and
    introducing the adjusted water feed stream into the falling film evaporator, and maintaining the $pH_{feed}$ value in a range so that a $pH_{cold}$ value of a falling film evaporator concentrate of the falling film evaporator is in the range of 10.8 to 12 to prevent silicate precipitation in the falling film evaporator concentrate.

20. A method of operating a falling film evaporator comprising:
    introducing a water feed stream into the falling film evaporator, wherein
        the water feed stream contains (i) silicon, and (ii) grater than 200 ppm of a component selected from the group consisting of magnesium, calcium, and a combination thereof, as measured in ppm of calcium carbonate equivalent;
    evaporating a portion of the water feed stream to form a falling film evaporator concentrate having a silica content of at least 200 mg/L, and
    operating the evaporator at a $pH_{cold}$ value of 10.8 to 12 in the falling film evaporator concentrate to prevent silicate precipitation.

21. The method of operating the falling film evaporator according to claim 1, wherein adjusting the $pH_{cold}$ value of the falling film evaporator concentrate further comprises:
    adjusting a $pH_{feed}$ value of the water feed stream before introducing the water feed stream into the falling film evaporator.

22. The method of operating the falling film evaporator according to claim 1, wherein the water feed stream has an excess of silicon relative to the combined amounts of calcium and magnesium.

* * * * *